United States Patent [19]
Uno et al.

[11] 4,123,764
[45] Oct. 31, 1978

[54] EXPOSURE CONTROL DEVICE

[75] Inventors: Naoyuki Uno, Urawa; Tetsuji Shono, Saitama; Fumio Urano, Omiya; Masahiro Kawasaki, Tokyo, all of Japan

[73] Assignee: Asahi Kogaku Kogyo Kabushiki Kaisha, Tokyo, Japan

[21] Appl. No.: 644,018

[22] Filed: Dec. 24, 1975

[30] Foreign Application Priority Data

Dec. 26, 1974 [JP] Japan .................................. 50-3778

[51] Int. Cl.² .............................................. G03B 7/08
[52] U.S. Cl. ....................................... 354/24; 354/38; 354/60 R
[58] Field of Search .................... 354/23 R, 23 D, 24, 354/26, 28, 30, 36, 37, 38, 39, 40, 41, 43, 45, 47, 48, 50, 51, 60 R

[56] References Cited
U.S. PATENT DOCUMENTS

| 3,554,104 | 1/1971 | Winkler et al. | 354/38 |
| 3,638,544 | 2/1972 | Kitai | 354/51 |
| 3,829,867 | 8/1974 | Ono | 354/28 |
| 3,863,263 | 1/1975 | Itagaki | 354/24 |
| 3,896,456 | 7/1975 | Toyoda | 354/24 |
| 3,896,460 | 7/1975 | Sahara et al. | 354/38 |
| 3,945,024 | 3/1976 | Hasegawa et al. | 354/29 |
| 3,950,765 | 4/1976 | Nanba et al. | 354/29 |
| 3,964,073 | 6/1976 | Korbori et al. | 354/60 R |
| 4,011,569 | 3/1977 | Mashimo et al. | 354/38 |

FOREIGN PATENT DOCUMENTS

| 2,434,152 | 2/1975 | Fed. Rep. of Germany | 354/23 D |
| 1,385,075 | 2/1975 | United Kingdom | 354/24 |

Primary Examiner—Russell E. Adams
Attorney, Agent, or Firm—Sughrue, Rothwell, Mion, Zinn and Macpeak

[57] ABSTRACT

An automatic exposure control device is disclosed which is capable of aperture dominant and shutter speed dominant exposure control operation as well as manual exposure control operation. A logarithmic compression circuit including transducers develops voltages directly dependent upon the APEX indicating quantities $Bv$, $Sv$, $Tv$ and $Av$. For automatic operation one of the voltages dependent upon $Tv$ or $Av$ is set into the circuit by manual control, and the other is calculated by the APEX indication formula $Bv + Sv = Tv + Av$, and applied as an output to the shutter control or aperture control mechanism. An indicator means is connected in the circuit to provide $Tv$ or $Av$ indications depending on the exposure control mode selected for the camera.

5 Claims, 3 Drawing Figures

EXPOSURE CONTROL DEVICE

CROSS REFERENCE TO RELATED APPLICATIONS

Reference is made to the following two related applications filed on the same date herewith which are incorporated herein by reference:

(1) "Exposure Control Device" by Naoyuki Uno, Tetsuji Shono, Fumio Urano and Masahiro Kawasaki, U.S. application Ser. No. 643,658.

(2) "Automatic Exposure Control Device" by Masahiro Kawasaki, U.S. application Ser. No. 644,012.

BACKGROUND OF THE INVENTION

The present invention relates to an automatic exposure control device which can select an automatic exposure control operation of either the aperture dominant type or the shutter speed dominant type.

In the so-called "automatic exposure control operation of shutter speed dominant type" (hereafter referred to as the "EE mode operation") wherein the aperture level of a photographic lens system is controlled in response to the brightness of an object, the sensitivity of film and the exposure time, the operator can easily take into consideration the motion of the object by selecting a high shutter speed for an object which has swift motion. For the depth of field, however, the EE mode operation is constrained to follow the aperture level, which is determined automatically. Thus, the EE mode operation is not fully satisfactory in certain cases, because, for example, the depth of field is the most important picturing element in the case where the object is a still article.

On the other hand, an absolutely contrary conclusion can be deduced for "automatic exposure control operation of the aperture dominant type" (hereafter referred to as "ES mode operation"), wherein the exposure time of a shutter is controlled in response to the brightness of an object, the film sensitivity and the selected aperture level. For example, an excessive exposure time may be imparted to an object of swift motion, because the selection of shutter speed is not left to the photographer.

Since neither of the conventional automatic exposure control operations is always suitable, it would be desirable to have a control device, in which selection can be made between the automatic exposure control operations of the aperture dominant type and of the shutter speed dominant type by simplified changeover means in accordance with the condition of an object.

SUMMARY OF THE INVENTION

In accordance with the present invention, an exposure control device is provided which is capable of operating in the aperture dominant and shutter dominant automatic modes and in the manual exposure mode, and further includes an indicator means which is adapted to display either the aperture or shutter speed, and is also adapted to operate as an exposure indication meter.

DETAILED DESCRIPTION OF THE INVENTION

Figure 1:
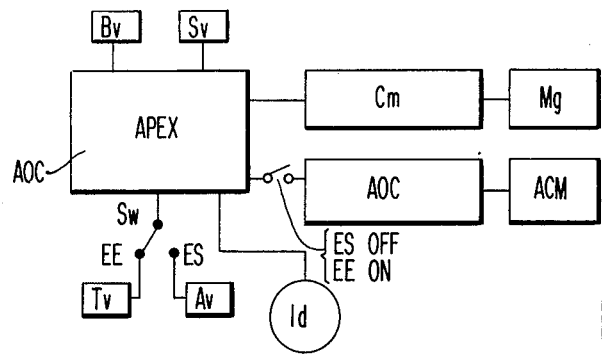
FIG. 1 is a block diagram showing the overall construction arrangement of an exposure control device according to the present invention.

FIG. 1 is a block diagram showing one embodiment of the present invention, in which the reference letters, $Bv$, $Sv$, $Tv$ and $Av$ respectively indicate transducers, such as silicon photodiodes or variable resistors, corresponding to the APEX indicating quantities of brightness of an object, sensitivity of film, manual exposure time and manual aperture level. An APEX operation circuit is an electric circuit which is so constructed as to obtain an output corresponding to a desired APEX indicating quantity based on a photographic operation equation of $Bv + Sv = Tv + Av$. Since the APEX operation circuit is made into an analogue circuit in the present embodiment as will be described below, it is usually constructed to have the APEX indicating quantities $Bv$, $Sv$, $Tv$ and $Av$ converted by the corresponding transducers and logarithmic elements (transistors or diodes) in proportion to (or in inverse proportion to) the applied voltage so as to accomplish the addition and subtraction required to solve the above photographic equation.

A time constant circuit and commparator $Cm$ and a magnet $Mg$ are provided and are constructed similar to those of well-known circuits for ES mode operation. The time constant circuit converts the output of the APEX operation circuit AOC corresponding to the APEX indicating quantity $Tv$ into the shutter time period and the comparator $Cm$ controls the power supply to the magnet $Mg$. An automatic aperture control mechanism ACM is also provided, similar to that in conventional "EE type control mechanisms" and includes a comb-toothed ammeter system, commonly used in the prior art, or a closed loop control system which makes use of an electromagnetic mechanism as will be explained in detail in the following.

When in the ES operation, a change-over switch $Sw$ is connected to an ES terminal, and the manual aperture level $Av$ is applied to the APEX operation circuit AOC together with the quantities $Bv$ and $Sv$. Then, the $Tv$ corresponding output based thereon is applied successively to the time constant circuit, the comparator and the magnet circuit, and the shutter speed is automatically controlled so as to obtain exposure of proper level.

When in the EE operation, on the other hand, the changeover switch is connected to an EE terminal, and the manual exposure time $Tv$ is applied to the APEX operation circuit AOC together with the quantities $Bv$ and $Sv$. Then, the $Av$ corresponding output based thereon is applied to the automatic aperture control mechanism ACM by way of an aperture control circuit ACC, and the aperture level is automatically controlled so as to obtain the proper exposure level. In this instance, it may be sufficient that the quantity $Tv$ is used only for the APEX operation while the actual manual time control is accomplished mechanically or electrically in a manner as exemplified in the block diagram of FIG. 1.

An indicator $Id$ is made operative to indicate the quantities $Tv_{out}$ and $Av_{out}$ when the ES and EE operations are employed, respectively, and may comprise either LCDs, if desired, in place of an ammeter as used in the preferred embodiment. When the device is operated in a manual exposure control mode the indicator may comprise an exposure meter of either the follower needle type or the fixed point type.

Figure 2:
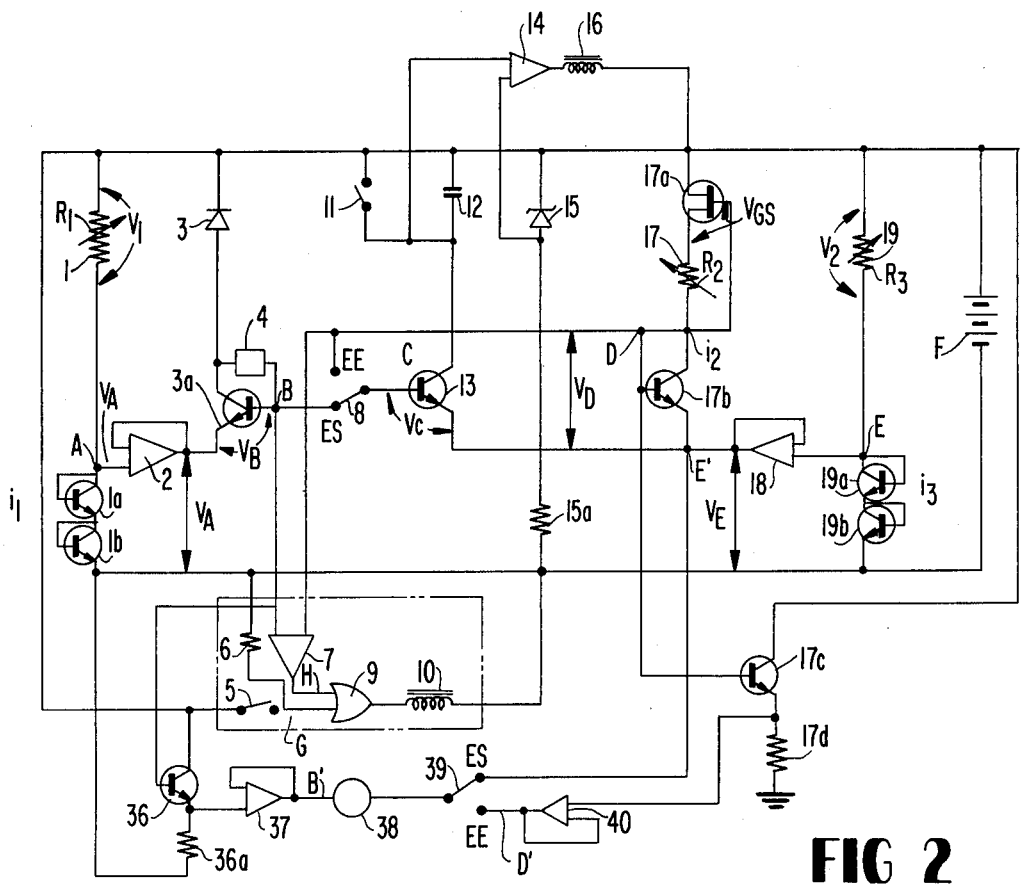
FIG. 2 is a circuit diagram of the exposure control device according to the present invention.

A preferred embodiment of the details of the system of FIG. 1, except for the mechanical details of the aperture control mechanism, is illustrated in FIG. 2.

Reference numeral 1 indicates a variable resistor which is set to correspond to the film sensitivity. Indicated at numerals 1a and 1b are logarithmic compression transistors connected as diodes. Resistor 1 and transistors 1a and 1b are connected in series across a constant voltage power source F. The connecting point A is connected to an input terminal of an operation amplifier 2 which is connected as a voltage follower circuit. A feedback operation is effected through a buffer circuit 4 from the collector to the base (point B) of a logarithmic compression transistor 3a, which also has its collector connected with a photodiode or transistor 3. The diode 3 provides a current dependent upon scene brightness. A variable resistor 19, whose wiper is mechanically linked with the diaphragm of the camera, corresponding to the aperture level and is connected in series with logarithmic compression transistors 19a and 19b, which in turn are connected in the manner of a diode. Resistor 19 and transistors 19a and 19b are connected in series across the constant voltage power source F. The connecting point E between the variable resistor 19 and the transistor 19a is connected to the input terminal of an operation amplifier 18 which is connected as a voltage follower circuit. A variable resistor 17 corresponding to the manual shutter speed is used as a source resistor of a field effect transistor 17a, which constitutes a source follower circuit, and is connected to the collector of a transistor 17b which is connected as a diode. A logarithmic expansion transistor 13 has its emitter connected to the output of the operation amplifier 18, its base (point C) connected to the movable element of an ES-EE operation change-over switch 8, and its collector connected to an integrating capacitor 12 and a memory switch 11. The connecting point between a resistor 15a and a constant voltage diode 15 is connected to the input terminal of a comparator 14, which has its output terminal connected to a shutter magnet 16 for controlling the shutter open time.

A comparator 7 receives the outputs at the points B and C, has its output connected to one of the input terminals of an OR gate 9. The other input terminal of the OR gate 9 is connected to the connecting point between a resistor 6 and an EE trigger switch 5, which is connected in series with the power source F. The output terminal of the OR gate 9 is connected to a magnet 10 for controlling the aperture level during the EE mode operation.

The relation between the values $R_1$ of the variable resistor 1, the voltage $V_1$ between the ends thereof, and the electric current $i_1$ flowing through the transistors 1a and 1b, is defined by the following equation:

$$i_1 = V_1/R_1 \qquad (1)$$

The voltage $V_A$ at the point A can be expressed from the logarithmic compression characteristics between the base and the emitter of the transistors 1a and 1b by the following equation:

$$V_A = 2 \cdot h \log(i_1/i_s) \qquad (2),$$

(it should be noted that except where the contrary is indicated, all logarithms are to the base $e$)

where:
 $h = K \cdot T/g$;
 K: Boltzmann Constant;
 g: Charge of Electron; and
 $i_s$: Saturated Inverse Current between Base and Emitter of Transistor.

Here, it should be noted that the transistors 1a, 1b, 3a, 13, 17b, 19a and 19b have the same logarithmic compression characteristics between their base and emitter. The relationship between the voltage $V_B$ between the base and emitter of the transistor 3a and the output current $i_p$ of the photo diode 3, can be expressed by the following equation:

$$V_B = h \log(i_p/i_s) \qquad (3)$$

Also, if $V_{GS}$ is the voltage between the source and gate of transistor 17 the source current $i_2$ is defined by the following equation:

$$i_2 = V_{GS}/R_2 \qquad (4)$$

Therefore, the voltage $V_D$ between the base and emitter of the transistor 17b is:

$$V_D = h \log(i_2/i_s) \qquad (5)$$

Likewise, the current $i_3$ flowing through the transistors 19a and 19b is expressed as:

$$i_3 = V_2/R_3 \qquad (6),$$

and the voltage $V_E$ at the point E is:

$$V_E = 2 \cdot h \log(i_3/i_s) \qquad (7).$$

The variable resistors 1 and 19 are made to correspond to the APEX indicating quantities $Sv$ and $Av$ of the film sensitivity and the aperture level, as in the following equation:

$$R_1 = K_1 \cdot 2^{-0.5Sv} \qquad (8); \text{ and}$$

$$R_3 = K_3 \cdot 2^{-0.5Av} \qquad (9),$$

where:
 $K_1$: Proportionality Constant; and
 $K_3$: Proportionality Constant.

The variable resistor $R_2$ is so preset that the source current $i_2$ of the field effect transistor 17a is expressed for the APEX indicating quantity $Tv$ of the shutter speed by the following equation:

$$i_2 = K_2 \cdot 2^{Tv} \qquad (10),$$

where:
 $K_2$: Proportionality Constant.

Incidentally, the relationship between the photocurrent $i_p$ and the APEX indicating quantity $Bv$ of the brightness of an object is expressed by the following equation:

$$i_p = K_4 \cdot B = K_5 \cdot 2^{Bv} \qquad (11),$$

where:
 $K_4$: Proportionality Constant; and
 $K_5$: Proportionality Constant.

A detailed discussion of the operation of the electric circuit shown in FIG. 2 follows.

EE OPERATION

Under this condition, the ES-EE operation change-over switch 8 provides a direct connection between the points C and D. When the EE trigger switch 5 is closed, the level at the point G is held at a high voltage so that the output of the OR circuit 9 is also at a high level irrespective of the output of the comparator 7 (point H). The high level output from OR gate 9 energizes magnet 10 thereby permitting the diaphragm level to be altered, as will be explained more fully in connection with FIG. 3. The EE trigger switch 5 is used to eliminate blocking of power supply to the EE operation magnet 10 during photometry.

The relationship between the input to the comparator 7 or the voltage at the points B and D and the voltage at the point H is as follows:

The voltage at the point H is high when the voltage at the point B is equal to or higher than that at the point D; and the voltage at the point H is low when the former is lower than the latter. Here, the voltage levels at the points B and D are expressed, respectively, by the following equations:

$$\text{Voltage level at Point } B = V_A + V_B = 2h \log(i_1/i_s) + h \log(i_p/i_s) \tag{12}$$

and $$\text{Voltage Level at Point } D = V_E + V_D = 2h \log(i_3/i_s) + h \log(i_2/i_s) \tag{13}$$

The EE trigger switch 5 is released in synchronism with the operation of a release 32 (FIG. 3), the aperture level is progressively reduced by the action of a governor mechanism 25. In accordance with the aperture level thus reduced, the resistance of the variable resistor 19 is varied to progressively boost the voltage at the point E. Initially, the voltage at B will be greater than that at D during this mode. This is because the operation begins with the aperture fully open. Therefore resistor 19 has its highest resistance and voltage $V_E$ is at a minimum. As the aperture level is reduced (the $Av$ value or aperture number is increased) the voltage $V_E$ increases until the D voltage drops just below or equal to the B voltage. At that time the output from OR gate 9 drops, and EE electromagnet 10 deenergizes thereby releasing lever 27 (FIG. 3) which stops any further change in the aperture level.

If more specifically, the following relationship is deduced from the equations (12), (13), (8), (9), (10) and (11)

$$\frac{1}{\log_2 e}(Sv + Bv) - (Av + Tv) + \log(\frac{k_3^2}{k_1^2} \cdot \frac{k_5}{k_2}) = 0 \tag{14}$$

where:

$$\frac{k_3^2}{k_1^2} \cdot \frac{k_5}{k_2} = 1 \tag{15}$$

then the aperture level is determined when the equation $Sv + Bv = Av + Tv$ holds, thus affording exposure of proper level. The exposure time during EE mode operation is selected by the operator by setting a dial which is mechanically linked to the wiper of variable resistor $R_2$, as explained previously. Also, it is possible for there to be a direct mechanical or electrical connection between the dial and the exposure control element. In the preferred embodiment, however, the value of the resistor $R_2$, selected by the operator during EE or during manual mode, controls the actual exposure time via the logarithmic extension transistor 13, the time constant circuit, comprising memory switch 11 and capacitor 12, the comparator 14, and the exposure control electromagnet 16. Since the voltage $V_C$ between the base and emitter of transistor 13 is equal to the voltage between the base and emitter of transistor 17b, the collector current $i_c$ of the logarithmic extension transistor 13 can be expressed by the following equation:

$$i_c = i_2 = k_2 \cdot 2^{Tv} \tag{16}$$

When, in this instance, the memory switch 11 is released in synchronism with a front screen, the voltage $V_C$ across the capacitor 12 can be expressed, if the capacity of the capacitor is denoted $C_C$, by the following equation:

$$V_C = i_c \cdot t/C_C \tag{17}$$

If the Zener voltage of the constant voltage diode 15 be denoted $V_S$, the time period $t_1$ from the release of the memory switch 11 to the power supply block of the ES operation magnet 16 can be deduced from the following equation:

$$t_1 = V_S \cdot C_C/i_c = (V_S \cdot C_C/K_2)2^{-Tv} \tag{18}$$

By selecting the parameters so that, $$V_S \cdot C_C/K_2 = 1 \tag{19}$$

then the time $t_1$, between the simultaneous opening of the shutter and switch 11 and the deenergization of the shutter holding magnet 16, is defined by the correct APEX indication relationship:

$$t_1 = 2^{-Tv} (\text{sec}) \tag{20}$$

As has been described in the above, the exposure time obtainable has the value which can be preset manually, and the aperture level obtainable has the level which can be preset automatically for the proper exposure, thus accomplishing the desired EE operation.

ES OPERATION

During the ES operation, the ES-EE operation change-over switch 8 is connected exactly as shown in FIG. 2, and provides a connection between the points C and B. The aperture level is set manually, and the resistor 19 has a value dependent thereon.

In this case the voltage $V_C$ between the base and emitter of the transistor 13 is expressed by the following equation:

$$V_C = V_A + V_B - V_E$$

$$= h \log \frac{k_5}{k_1^2} \cdot \frac{k_3^2}{i_s} \cdot 2^{(Sv + Bv - Av)} \tag{21}$$

Here, this equation (21) can be changed in view of the equation (15) into the following equation:

$$V_C = h \log(K_2 \cdot 2^{(Sv + Bv - Av)}/i_s) \tag{22}$$

The collector current $i_c$ of the logarithmic extension transistor 13 is expressed as follows:

$$i_c = K_2 \cdot 2^{(Sv + Bv - Av)} \qquad (23)$$

From equations (17), (18) and (19), the shutter open time $t_1$ becomes:

$$t_1 = 2^{-(Sv + Bv - Av)} \text{ (sec)} = 2^{-(Tv)} \qquad (24).$$

The exposure time is thus automatically controlled by selecting the aperture level during ES mode operation. It will be noted that the circuit described herein up to this point is the same as that described in the above identified copending application (corresponding to Japanese patent application 50-4470).

The automatic exposure control operations of the ES and EE modes are carried out in the fashion described thus far. The Tv and Av indicating operations will now be discussed. A transistor 36 and a resistor 36a are constructed in an emitter-follower circuit, and they are provided to accomplish a level shift operation in order to set the voltage at the point B' at a suitable potential level for the indicating operation. The transistor 36 and the resistor 36a are connected to one terminal of an ammeter 38 by way of a voltage follower circuit 37, comprising a feedback connected operational amplifier. The other terminal of ammeter 38 is connected via EE-ES switch 39 to either terminal E', directly, or terminal D', via another voltage follower circuit 40. The latter also comprises a feedback connected operational amplifier 40. A transistor 17b and a resistor 17d are constructed in an emitter-follower circuit, and they are provided to accomplish a level shift operation comparable to that provided by transistor 36 and resistor 36a.

When the switches are set for ES operation the voltage across the ammeter 38, $V_M$ is:

$$\{V_A + V_B - V_{be(36)}\} - \{V_E\}.$$

Since $V_{be(36)}$ is a level adjusting constant controlled by adjusting the value of resistor 36a, it can be appreciated that the voltage $V_M$ is dependent entirely upon:

$$V_A + V_B - V_E,$$

which determines automatically the APEX indication value Tv. Thus, the meter needle position is dependent upon the Tv value.

When the switches are set for EE operation, $V_M$ is:

$$\{V_A + V_B - V_{be(36)}\} - \{V_D + V_E - V_{be(17)}\}.$$

It will be appreciated that at the time the meter is being read, the aperture is in its fully open position. Thus, $V_{be(36)}$, $V_{be(17)}$ and $V_E$, in the above equation are constants. Therefore, the value of $V_M$ and the needle position is dependent entirely upon the computed value of:

$$V_A + V_B - V_D,$$

i.e., the position of the needle gives the Av value calculated. When the release button is depressed the calculated Av controls the aperture mechanism which alters the value of $V_E$. However, at this time the meter is not being read.

A brief discussion will now be provided for the case where a manual exposure control operation is carried out. Since, in this instance, the manual exposure time is electrically controlled in the construction of the present circuit and mechanism, it is sufficient for the purpose that the switch 8 provides a connection between the points C and D and that the aperture control is effected in the mechanically manual manner.

In the manual case, three methods are considered possible for the indicating operation. The indicating methods include, the shutter follower needle type, the aperture follower needle type and the fixed point registration type. In shutter follower needle type, it may be sufficient that switch 39 provides a connection between the points B' and E' in the same manner as provided in the ES operation, and that a follower needle, which is made coactive with a manual exposure time control dial is also provided. Proper exposure settings will therefore be indicated when the follower needle is registered with the indicating needle of the ammeter.

In the aperture follower needle type, it may be sufficient that the switch 39 provides a connection between the points B' and D' in the same manner as used for the indication during EE operation. In this case a follower needle, which is made coactive with a manual aperture control ring, is provided to effect the proper exposure when it is registered with the indicating needle of the ammeter.

In the indicating method of the fixed point registration type, it may also be sufficient that the switch 39 provides a connection between the points B' and D' in the same manner as that used during EE operation. In this case the proper exposure could be indicated when the needle is registered with a suitable index. The indicating methods of the aperture follower needle type and the fixed point registration type are the same in their circuit arrangements, but substantial differences do exist. In the method of the aperture follower needle type, the resistor 19 relating to the manual aperture control must be fixed at a level corresponding to the fully open position of the aperture, so the ammeter needle will register the proper position of the aperture required for correct exposure, i.e., it will not be influenced by the actual aperture level set. In this way the match-up between the ammeter needle and the follower needle has significance. For the method of the fixed point registration type, the resistor 19 has its level varied in response to the aperture level. Thus, in this case the ammeter needle is influenced by the actual aperture setting, as well as the shutter speed setting, the film speed setting, and the brightness. The needle will assume a neutral index position when the manual settings are such that the APEX operation equation $Bv + Sv = Tv + Av$. Simple mechanical means for preventing variation of resistor 19 from a value corresponding to fully open aperture, to permit the aperture follower type indication, is well known.

The various modes can be tabulated as follows:

| Mode of Exposure Control | Exposure Control Sw. 8 | Exposure Control Sw. 5 | Av TvVR | Av VR | Indication Sw. 39 | Indication | Remarks |
| --- | --- | --- | --- | --- | --- | --- | --- |
| ES | C-B | OFF | X | O | ES | Meter | |
| EE | C-D | ON | O | O | EE | Meter | R* |
| Manual 1 | C-D | OFF | O | O | ES | Meter* | R** |
| Manual 2 | C-D | OFF | O | X | EE | Meter** | |

-continued

| Mode of Exposure Control | Exposure Control | | | Av VR | Indication | | Remarks |
|---|---|---|---|---|---|---|---|
| | Sw. 8 | Sw. 5 | TvVR | | Sw. 39 | Indication | |
| Manual 3 | C-D | OFF | O | O | | EE | Meter*** |

In the above Table: TvVR and AvVR designate the variable resistors 17 and 19 respectively. An X indicates that the resistor is out of the closed loop system, i.e., does not enter into the control of any camera elements. A "O" indicates the opposite.
Meter* Meter and Shutter Follower Needle;
Meter** Meter and Apertire Follower Needle;
Meter*** Meter and Fixed point registration;
R* AvVR is used in the present closed-loop embodiment but is dispensed with in the open-loop embodiment; and
R** TvVR is not at the same potential for the operation.

Figure 3:
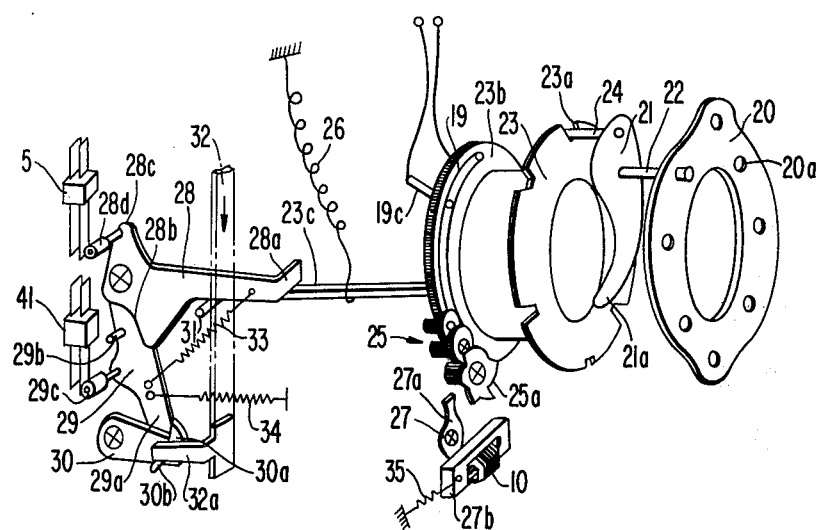
FIG. 3 shows one embodiment of an EE operation mechanism which is controlled by the circuit of FIG. 2.

FIG. 3 shows one embodiment of the EE operation mechanism which is controlled by the circuit of FIG. 2. A member is formed with bores 20a, through which are inserted a plurality of pins 22 providing shafts of rotation for aperture control blades 21. Other side pins 24 of the aperture control blade 21 are fitted in notches 23a of an aperture control ring 23 so that the aperture control blades may be closed when the aperture control ring 23 is turned in the clockwise direction as shown. At one side of the aperture control ring 23 is formed a gear portion 23b which is in meshing engagement with a group of governor mechanisms 25. On the gear portion 23b, moreover, there is formed an arm 23c which is made to extend toward the body side of a camera until it engages with the leading end 28a of an aperture swing lever 28. This arm 23c is turned onto a stopper 31 against the action of a spring 26, which is a power source tending to rotate the aperture control ring 23 clockwise, as seen from the lens side. The stopper 28a sets the aperture control blades 21 to the "fully open" condition.

Reference numerals 10 and 27 indicate an electromagnet and a ratchet of the control ring, respectively. The ratchet 27 has a leading end 27a engageable with a ratchet wheel 25a, which acts as the last stage of the grouped governor mechanism 25, when the electromagnet 10 is deenergized. The other end of ratchet 27 is coactive as an armature with the electromagnet 10.

Indicated at numeral 29 is an aperture drive lever, which is connected with the aperture swing lever 28 by means of a spring 33 having a stronger spring action than the spring 26. Before the shutter release operation, the aperture drive lever 29 is retained at its one end 29a by the action of a claw 30a of a retaining plate 30. A pin 28d, which is covered with an insulating material, is fixed to the other end 28c of the swing lever 28 to thereby render the trigger switch 5 for the EE operation conductive, while another pin 29c covered with an insulating material is also fixed to the drive lever 29 to thereby close a memory switch 41. Memory switch 41 provides the well known function of opening the buffer feedback link 4 to thereby store a voltage $V_B$ once the shutter release button is pressed.

When, in this instance, a release plate 32 is actuated from the outside of the camera in the direction of the arrow as shown, its projecting portion 32a pushes a pin 30b on the retaining plate 30 so that the retention of the drive lever 29 may be released by turning the retaining lever 30 in the clockwise direction. Then, the drive lever 29 is turned in the counterclockwise direction as shown by the action of a strong spring 34 so as to render the memory switch 41 non-conductive and then to effect counterclockwise rotation of the swing lever 28 by resorting to the fact that a pin 29b pushes a cam surface 28b of the swing lever 28. The reason why the pin 29b and the cam surface 28b are at first positioned at a suitable spacing from each other is to render the switch non-conductive for that particular time period.

As soon as the swing lever 29 starts its rotational motion, the trigger switch 5 is rendered non-conductive to effect the operation in the electric circuit, as has been described hereinbefore. The aperture control ring 23 and the gear portion 23b start their clockwise rotations with the aid of the action of the spring 26, together with the resistor 19, while the ratchet wheel 25a of the governor portion 25 starts it counterclockwise rotation. After lapse of the operation time t, the electromagnet is deenergized, and the control ring is stopped by retaining the wheel 25a at the ratchet 27a by means of a spring 35, thus determining the desired aperture level.

Incidentally, although omission is made in FIG. 3, the drive lever 29 and the ratchet 27 after their operations may either be set in the position of FIG. 3 upon the winding operation or they may be of the quick-return type.

Moreover, although the memory switch 41 of the embodiment illustrated is rendered non-conductive by the action of the aperture drive lever 29, it may be rendered conductive or non-conductive if this operation is carried out immediately before the operation of the aperture control blades 21 (the pop-up operation of a mirror should also be carried out if the camera is equipped with it).

Still moreover, the delay time of the electromagnet 10 (or the time period from the instant when the amplifier 7 is reversed to the instant when the armature 27b is released) and the operation delay of the mechanism can be regulated electrically.

Although not shown, the mechanical mechanism, which effectively prevents the ratchet 27 and the spring 26 from automatically controlling the diaphragm during ES and manual modes, is well known. A lever not shown holds lever 27a so it cannot interfere with the rotation of ring 23b. Also a manual stop ring, which is set by the operator stops the ring 23b at the position set by the stop ring.

As has been described hereinbefore, according to the present invention, the exposure control operation can be selected at the discretion of the operation between those of the aperture dominant type and of the shutter speed dominant type, thus providing an exposure control device which is remarkably suitable for photography.

What is claimed is:

1. An automatic exposure control device for a camera, said device being capable of accomplishing at least the aperture dominant exposure control operation, the shutter dominant exposure control operation and manual exposure control operation, said device being of the type having a logarithmic compression circuit for developing voltages $V_E$, $V_D$, $V_A$ and $V_B$ dependent on the APEX indicating quantites $Av$, $Tv$, $Sv$ and $Bv$, respectively, of aperture level A, manual exposure time T, film sensitivity S and brightness of an object B, so as to carry out the APEX operation in accordance with the relationship of $Av + Tv = Sv + Bv$; shutter speed control means for said camera having an input circuit means, said shutter speed control means being adapted to control the shutter speed in dependence upon the voltage applied to said input means, an aperture level determining means selectively operative to start adjustment of the aperture mechanism of said camera in response to the shutter release operation of said camera and to carry out said adjustment at a predetermined speed; said logarithmic compression circuit means including an aperture transducer means coactive with said aperture level determining means to develop said voltage $V_E$ dependent upon the $Av$ quantity; the improvement being characterized by, (a) automatic aperture circuit means responsive to the voltage corresponding to the $Bv$, $Sv$ and manually set $Tv$ quantities for stopping the aperture level determining means when the aperture mechanism is closed down an amount to cause said developed voltage $V_E$ to become equal or greater than $(V_A+V_B-V_D)$, said automatic aperture circuit means being selectively connectable and disconnectable with said aperture level determining means for shutter dominant and aperture dominant operations, respectively, (b) switchable shutter circuit means for selectively applying to said input circuit of said shutter control circuit, a voltage dependent directly upon $V_D$ for shutter preferred operation and a voltage dependent upon $(V_A+V_B-V_E)$ for aperture preferred operation, and (c) indicator means connected to said logarithmic compression circuit for selectively operating as an aperture indicator and a shutter speed indicator.

2. An automatic exposure control device as claimed in claim 1 wherein said indicator means comprises, a meter of the type having a pointer needle adapted to assume a position dependent on the voltage difference at two input terminals of said meter, first circuit means connected between said logarithmic compression circuit and one of said meter terminals for applying a voltage dependent upon the sum $V_A+V_B$ to said one terminal, and second circuit means connected between said logarithmic compression circuit and the other of said meter terminals for selectively applying voltages dependent upon $V_E$ and $V_D$ to said other terminal to cause said meter to register the APEX indication valves $Tv$ and $Av$, respectively.

3. An automatic exposure control device as claimed in claim 2 wherein, said switchable shutter circuit means comprises, a first switch having an ES and an EE position, said switch connecting a voltage dependent upon $V_D$ to said shutter control input circuit when switched to its EE position, and connecting a voltage dependent upon $V_A + V_B - V_E$ to said shutter control input circuit when in its ES position, and wherein said second circuit means for selectively applying comprises a second switch having an ES and EE position, said switch connecting to said meter a voltage dependent upon a manually selected aperture setting when in its ES position and connecting to said meter a voltage dependent upon a manually selected shutter speed when in its EE position.

4. An automatic exposure control device as claimed in claim 3 further comprising a shutter follower needle disposed to be viewed in superimposed relation with said meter pointer needle.

5. An automatic exposure control device as claimed in claim 3 further comprising an aperture follower needle disposed to be viewed in superimposed relation with said meter pointer needle.

* * * * *